United States Patent [19]
Feathers

[11] Patent Number: 5,857,736
[45] Date of Patent: Jan. 12, 1999

[54] ADJUSTABLE LINER STRUT

[76] Inventor: Mark E. Feathers, 243 Red Clay Rd., Apt. 201, Laurel, Md.

[21] Appl. No.: 904,537

[22] Filed: Aug. 4, 1997

[51] Int. Cl.⁶ .................................................. B60R 13/02
[52] U.S. Cl. ....................................... 296/214; 52/506.05
[58] Field of Search .................................. 296/214, 39.1; 52/506.05

[56] References Cited

U.S. PATENT DOCUMENTS

| | | | |
|---|---|---|---|
| 4,461,509 | 7/1984 | Yaotani et al. | 296/214 |
| 4,971,388 | 11/1990 | Knaggs | 296/214 |
| 5,440,932 | 8/1995 | Blevins et al. | 160/80 |
| 5,624,151 | 4/1997 | Guswiler | 296/214 |

*Primary Examiner*—Joseph D. Pape
*Attorney, Agent, or Firm*—Robert Halper

[57] ABSTRACT

A brace assembly for supporting a disrepaired headliner in the roof of a vehicle wherein one or a plurality of adjustable struts are placed transversely across the roof and its accompanying liner and shaped in conformity with the transverse shape of the roof. The struts are adjustable and have at their ends tongues placed between the liner and the side molding of the roof. The brace assembly comes in a variety of colors to match the furnishings of the vehicle and is coated with a fluoroscopic paint.

7 Claims, 1 Drawing Sheet

ADJUSTABLE LINER STRUT

FIELD OF INVENTION

This invention pertains to a headliner support to maintain headliners in automobile vehicles, vans or trucks in proper position.

BACKGROUND OF INVENTION

Typically the headliner of a vehicle is mounted to the underside of a roof and can be made of a variety of fabrics including synthetic materials such as nylon or polyester. Eventually these headliners come into disrepair and need to be replaced or supported because of sagging due to deterioration of the adhesive binding the liner to a backing.

There have been a number of attempts to cure this defect as illustrated by the patents described below.

U.S. Pat. No. 2,118,563 shows a headliner fabric provided with a plurality of listings adapted to receive ribs of the headliner supporting framework. The listings extend transversely across the headliner and are longitudinally spaced apart. The ribs are made up in pivotal sections wherein each rib is received through a listing. Side frame members are secured by a rivet to the outer end of the ribs. The headliner is molded over the edge of the side frame members and they are clamped down against a filler bead. A central frame member is inserted between portions of the ribs and the headliner and attached to the ribs in position. When this assembly is complete, the structure is pivotally collapsed to be received within the vehicle body. Afterard it is expanded and seated within the recess formed along the side walls and front and rear walls of the vehicle body. The ribs are flexible as is the entire framework so as to permit it to be sprung in position.

U.S. Pat. No. 2,143,293 shows what is described as an inner trim for covering the interior of the roof of the vehicle. The trim material is secured to the frame at its marginal edges and is supported intermediate its edges by a plurality of bars which are pivotally mounted on the frame of the body. The trim is secured to the bars by stitching.

U.S. Pat. No. 4,840,832 teaches a molded automobile headliner formed from a batt of polymeric fibers. The headliner is a highly deformable resilient material which still has a self supporting rigidity allowing the liner to retain its shape once installed. To install the liner, it is folded over longitudinally into a U shape to permit the same to pass through a vehicle window on the passenger side. Then the headliner is unfolded, positioned and secured to the roof of the vehicle using Velcro hook and loop strips.

U.S. Pat. No. 4,902,065 teaches a roof bow support for covers on truck beds. The unit comprises a pair of upwardly angled mounting members, each having a C shaped socket. Each member is secured to the lip of the bed of the truck by screws or bolts, Rounded end pieces fit into the socket at one end and engage flexible tubes at the other ends. The tubes referred to as bows provide support for the truck covers.

U.S. Pat. No. 4,971,388 uses a brace assembly as headliner support. The assembly comprises flexible plastic strips that fit into steel clips. The clips have tabs that are inserted between a sagging liner and an edge molding of the vehicle. The clips also include sleeves and a butt plate. The butt plates cooperate with the molding to prevent horizontal motion of the clips and also prevent the ends of the strips from moving outwardly. After insertion of one tab in the molding, one end of the plastic strip is inserted into the sleeve of the clip and the strip is normally bowed toward the roof as much as desired. Then the strip is marked off at the opposite edge molding to be cut to an appropriate length. The second clip is now installed between the liner and molding and the strip inserted into the sleeve clip.

U.S. Pat. No. 5,624,151 teaches a headliner retainer for supporting a sagging vehicle headliner against the interior roof structure of a passenger compartment made of two elongate members selectively attachable to one another which can be springedly and flexibly retained against the headliner. One member is provided with a plurality of aligned apertures and the other has a plurality of outwardly extending projections engagable with the aperturers so as ro facilitate adjustment in length so that the retainer can be flexibly snapped into place agains the sagging headliner. Each of the projections is rotatably mounterd on an axis which is eccentrically displaced with respect to each projection.

While the above liners cited above perform satisfactorily, they are expensive, time consuming or too complex. They also require either stitching, drilling, bolting, riveting or cutting.

Accordingly it is an objective of this invention to provide a simpler, inexpensive support assembly which is easy to install.

It is a further objective of this invention to provide a liner support which is adaptable to any size vehicle without the necessity of making any special measurement or cutting.

It is still an object of this invention to make an adjustable liner brace that requires no additional framework nor stitching nor any bolts or to be secured to the molding.

SUMMARY OF THE INVENTION

The invention is directed to a flexible headliner support or strut which is designed to correct any impaired liner. The strut features a main hollow body portion and a pair of extensible plates telescopingly received in opposed ends of the body portion, respectively. A set screw fastener in the body member engages each extensible plate after it has been adjustably positioned to fit snugly between the opposed headliner and its molding in a particular vehicle. By virtue of the flexibility of the strut, it can be readily flexed to conform to the transverse curvature of the roof of the vehicle and its corresponding headliner

DETAILED DESCRIPTION OF THE INVENTION

Figure 1:
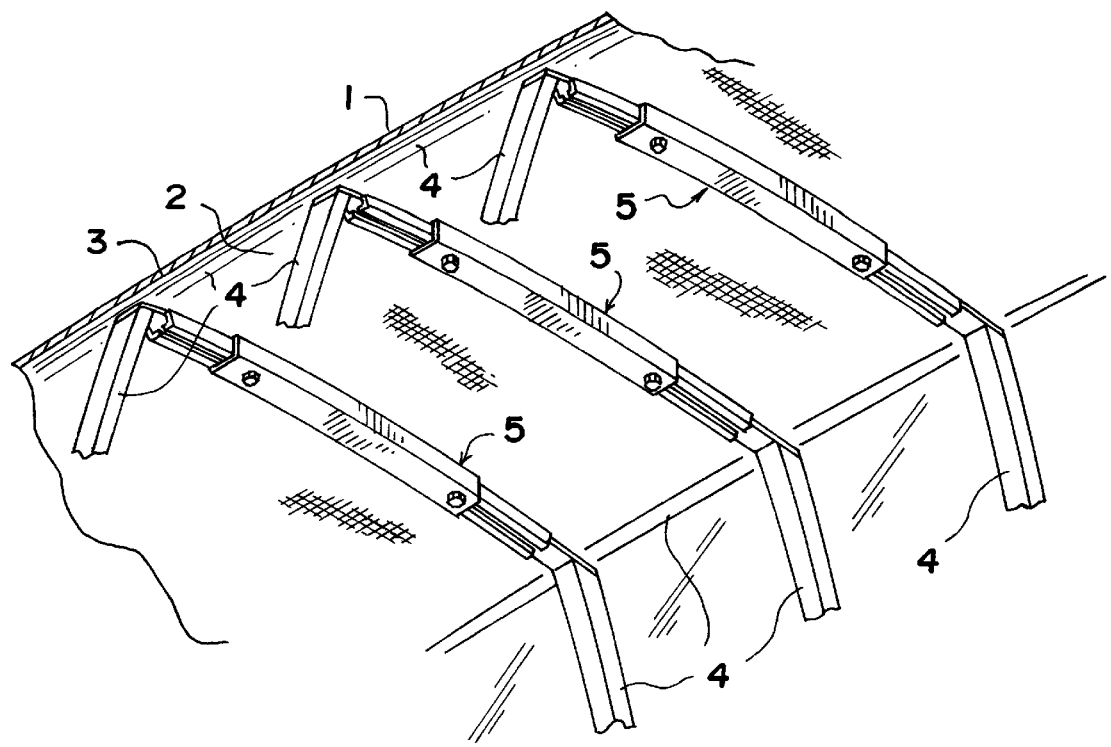
FIG. 1 is a perspective view showing the roof of a vehicle with its attendant headliner and a plurality of support assemblies for bracing the liner.
Figure 2:
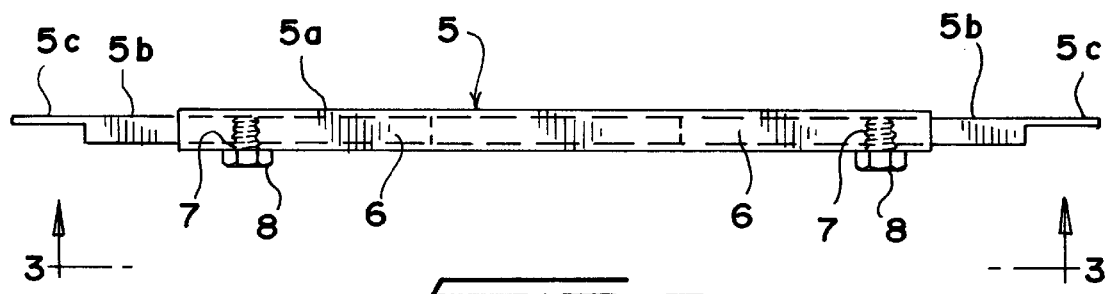
FIG. 2 shows a side view of a single strut fitted against the vehicle side molding.
Figure 3:
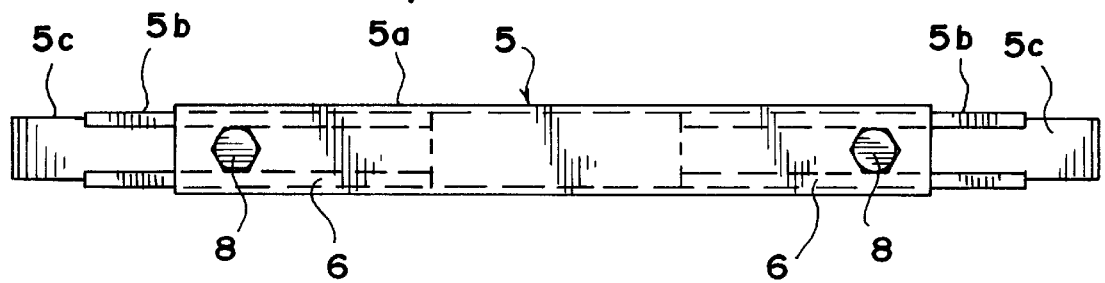
FIG. 3 is a plan view of FIG. 2 taken on line 3—3.

FIG. 1 depicts the interior of a roof 1 of a vehicle having a headliner 2 made of a fabric which is adhesively bonded to a backing 3. The liner extends the width and length of the vehicle and its ends are tucked into the side and end molding 4. One or a plurality of struts 5 extend transversely across the roof and the headliner adjacent the region of disrepair. The strut is made of a strong but flexible material, such as a thermoplastic, which is flexible enough so that it can be flexed to conform to the slope of the roof and its attendant headliner. The strut comprises a main tubular body portion 5a and a pair of extensible plates 5b which end in tapered tongues 5c. The plates are telescopingly received in opposed ends of the main body portion. At each end of the main body portion a pair of channels or rails 6 are adhesively bonded. These channels will extend inwardly of the body portion to accommodate substantially the length of the extensible plates. As seen in FIG. 2 threaded bores 7 are placed in the underside of the main body portion of the strut for placing of set screw fasteners 8 to secure the extensible plates after the plates have been adjustably positioned so that the tapered tongues can fit between the headliner and its molding. To accommodate any vehicle it is estimated that the main body portion of the strut should be about 32 inches long and the length of each extensible plate including the tongue would be about 7 inches. The width of the main body portion would be about 2.5 inches, height 1.5 inches. The height of the channels would be about 5/8 inches, the thickness of the extension plates about 3/8 inches and the tapered tongue about 2 inches long and 1/16 inches thick.

To install the strut, the entire assembly is placed in the area of disrepair. One tongue of the extension plate is inserted into the molding and the set screw tightened to secure the extension plate. The strut is then placed upwardly against the sagging liner, flexed in conformity with the transverse curvature of the roof and liner and then the other end of the strut with its attached extension plate and tongue is adjustably positioned, the set screw tightened and the tongue placed in the side molding. The struts can be painted in any color so as to match the furnishings of the vehicle. As an added feature the struts may be painted with a fluoroscopic coating so that they would glow in the dark and serve as a marker for one's vehicle.

Suffice it to say an adjustable brace or strut support for a vehicle headliner has been provided which is simple, inexpensive and easy to install. While a specific embodiment of the invention has been described it will occur to those skilled in the art that various alterations or modifications could be made without departing from the scope of the described invention.

I claim:

1. A vehicle body having a roof with horizontal and transverse curvature, molding extending around said roof, and an interior headliner covering said roof and having ends tucked into said molding,
    a) a brace assembly for supporting said headliner and being flexible so that it can be bent in conformity with said transverse curvature,
    b) said brace assembly comprising one or more struts having a main body portion and a pair of extensible plates being received in opposed ends of said body portion, respectively, said extensible plates ending in tapered tongues,
    c) set screw fasteners adjacent an end and at an underside of said body portion, said set screws engaging and securing each said extensible plate after it has been adjustably positioned so that its tapered tongue fits snugly between said headliner and said molding.

2. A vehicle body as in claim 1 wherein said strut assembly is made of a resilient thermoplastic material.

3. A vehicle body as in claim 1 wherein said ends of said main body portion of said strut assembly has a pair of rails adhesively bonded to the interior of said main body portion, said rails extending inwardly for substantially the length of said extension plates, said rails facilitating the telescoping of said extension plates.

4. A vehicle body as in claim 1 wherein said brace support assembly is placed adjacent a sagging headliner and is adjustably positioned to repair said headliner.

5. A vehicle body as in claim 1 where in said main body portion of said strut is a rectangular tube about 32 inches long and each said extension plate including said tongue is about 7 inches long.

6. A vehicle body as in claim 1 wherein said brace assembly is made in a color to match the furnishings of the vehicle.

7. A vehicle body as in claim 1 wherein said brace assembly is coated with fluoroscopic paint to serve as a marker for the vehicle at night.

* * * * *